A. L. Bayley,
Steam Trap.
N° 32,817.　　　Patented July 16, 1861.

Witnesses:
J. W. Coombes.
R. S. Spencer

Inventor:
A. L. Bayley
per Munn & Co.
Attorneys.

UNITED STATES PATENT OFFICE.

A. L. BAYLEY, OF AMESBURY, MASSACHUSETTS.

STEAM-TRAP.

Specification of Letters Patent No. 32,817, dated July 16, 1861.

*To all whom it may concern:*

Be it known that I, A. L. BAYLEY, of Amesbury, in the county of Essex and State of Massachusetts, have invented a new and useful Improvement in Steam-Traps; and I do hereby declare that the following is a full, clear, and exact description of the same, reference being had to the accompanying drawings, forming part of this specification, in which—

Figure 1:
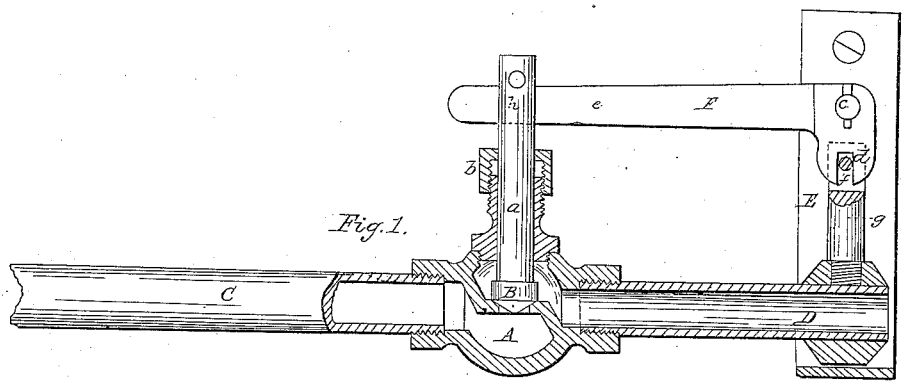
Figure 2:
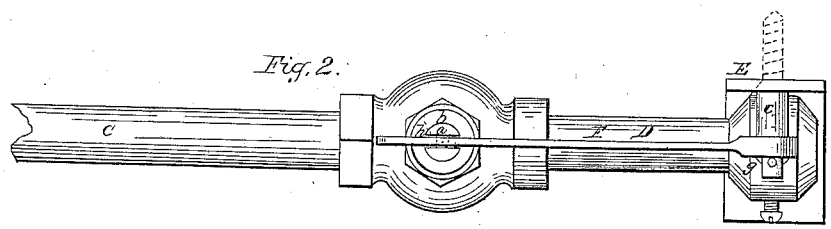

Figure 1, is a section of the trap. Fig. 2, is a plan of the same.

Similar letters of reference indicate corresponding parts in both figures.

To enable others skilled in the art to make and use my invention I will proceed to describe its construction and operation.

A, represents the valve box, and B, the valve. The box is like that of an ordinary steam stop valve and the valve of the puppet kind, having its stem $a$, fitted to slide easily through the stuffing box $b$. One side of the box is screwed to the end of the water escape pipe C, and the opposite side has screwed into it a short piece of pipe D, which is in line or parallel with pipe C, and forms a continuation of, the latter pipe, communicating with it when the valve is open.

E, is a bracket or plate intended to be secured near the extremity of the pipe D, to a wall or any fixture to constitute a support for the fixed fulcrum $c$, on which works the lever F, by which the valve is operated. This lever has a longer arm $e$ and a shorter arm $d$, the shorter arm being slotted to receive a pin $f$, carried by a stud $g$, which is secured rigidly to the end of the pipe, and the longer arm passing easily through a slot $h$, in the valve stem.

The expansion and contraction of the pipe C, causes a longitudinal movement of the pipe D, along with the valve box, and the latter pipe carrying the stud $g$, and pin $f$, causes the arm $d$, to move in a direction nearly parallel with the pipes and so causes the arm $e$, to move toward and from the valve box and thus by its action on the valve stem to close and open the valve; the expansion of the pipe when it contains steam causing the said arm $e$, to move toward the valve box and so to close the valve and the contraction of the pipe when it contains water causing said arm to move in the opposite direction and so to open the valve. The amount of longitudinal movement of the pipes, being multiplied by the long arm $e$, of the lever, causes the opening and closing of the valve to be effected by a very slight contraction and expansion of the pipe.

I do not claim broadly the operation of valves by the expansion of the steam pipes but

What I claim as my invention and desire to secure by Letters Patent is—

The arrangement in the manner herein shown and described of the double armed lever F and bracket E, with the valve B, valve box A and pipes C, D, for the purpose set forth.

A. L. BAYLEY.

Witnesses:
DANIEL WEBSTER,
C. H. FOLSOM.